United States Patent
Coric et al.

(10) Patent No.: US 9,118,441 B2
(45) Date of Patent: Aug. 25, 2015

(54) LAYOUT-OPTIMIZED RANDOM MASK DISTRIBUTION SYSTEM AND METHOD

(71) Applicants: Srdjan Coric, Gilbert, AZ (US); Steven D. Millman, Gilbert, AZ (US)

(72) Inventors: Srdjan Coric, Gilbert, AZ (US); Steven D. Millman, Gilbert, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 437 days.

(21) Appl. No.: 13/750,936

(22) Filed: Jan. 25, 2013

(65) Prior Publication Data

US 2014/0211937 A1    Jul. 31, 2014

(51) Int. Cl.
| | | |
|---|---|---|
| *H04K 1/00* | (2006.01) | |
| *H04L 9/00* | (2006.01) | |
| *H04L 9/08* | (2006.01) | |
| *H04N 7/167* | (2011.01) | |

(52) U.S. Cl.
CPC .............. *H04L 9/003* (2013.01); *H04L 9/0861* (2013.01); *H04L 9/0869* (2013.01); *H04L 2209/04* (2013.01); *H04L 2209/12* (2013.01); *H04N 7/1675* (2013.01)

(58) Field of Classification Search
CPC ... H04L 9/0861; H04L 9/0869; H04N 7/1675
USPC .......................................................... 380/28
See application file for complete search history.

(56) References Cited

U.S. PATENT DOCUMENTS

| | | | |
|---|---|---|---|
| 2004/0019619 A1* | 1/2004 | Buer et al. ..................... 708/254 |
| 2005/0147243 A1* | 7/2005 | Baek ............................... 380/28 |
| 2007/0230695 A1* | 10/2007 | Sefzik et al. ................... 380/46 |
| 2009/0003598 A1 | 1/2009 | Itoh et al. |
| 2010/0086126 A1 | 4/2010 | Yokota et al. |
| 2010/0239091 A1 | 9/2010 | Amiel et al. |
| 2012/0162479 A1* | 6/2012 | Okamura ...................... 348/239 |

\* cited by examiner

*Primary Examiner* — Arvin Eskandarnia (74) *Attorney, Agent, or Firm* — Schmeiser, Olsen & Watts LLP (57) ABSTRACT

A data processing system includes a module for generating and distributing random masks to a number of cryptographic accelerators while providing for fewer total interconnects among the components generating the random masks. The module segments the tasks associated with generating random masks across a number of modules and blocks such that routing and timing problems can be minimized and layout can be optimized. A method for generating and distributing random masks to a number of cryptographic accelerators is also provided. The random masks are utilized by cryptographic accelerators to protect secret keys, and data associated with those keys, from discovery by unauthorized users.

16 Claims, 5 Drawing Sheets

LAYOUT-OPTIMIZED RANDOM MASK DISTRIBUTION SYSTEM AND METHOD

TECHNICAL FIELD OF THE INVENTION

The present invention generally relates to data security in electronic data processing devices. More specifically, the present invention relates to a data processing device which generates and distributes random masks for use in implementing cryptographic and data processing operations while achieving layout improvements.

BACKGROUND OF THE INVENTION

Some data processing systems have a need to achieve data security and engage in secure operations from time to time. In general, such secure operations are concerned with authenticating users and/or data, authorizing users and/or data, and securely communicating data. Data security and secure operations may be achieved in part by performing a variety of cryptographic operations on data objects. Cryptographic operations typically use keys to perform cryptographic operations on data being processed by the data processing system.

In some cryptographic operations, secret keys may be employed. Maintaining the secrecy of keys used in cryptographic operations is very important in maintaining the security of the data being processed. Various methods, including, for example, Differential Power Analysis (DPA), have been employed by intruders seeking to discover secret keys being used in cryptographic operations. The use of random masks (sets of randomized numbers) as part of cryptographic processing is one means that has become popular in helping to maintain the secrecy required in cryptographic operations and foil and/or inhibit intruders attempting to discover secret keys.

BRIEF DESCRIPTION OF THE DRAWINGS

A more complete understanding of the present invention may be derived by referring to the detailed description and claims when considered in connection with the Figures (not necessarily drawn to scale), wherein like reference numbers refer to similar items throughout the Figures, and:

DETAILED DESCRIPTION

In order to perform cryptographic operations, which may be computationally intensive, many data processing systems employ dedicated security circuitry and/or modules to specifically handle the execution of the cryptographic operations and functions, in effect offloading the main processor of the data processing system from this task, and allowing that main processor to focus on other tasks. This may allow the data processing system to better keep up with the processing required for data, such as, for example, packets being received by the data processing system. Absent dedicated circuitry and/or cryptographic modules, many data processing systems would suffer from unacceptable delays in processing incoming data.

In order for a cryptographic operation to be performed, both information about the data to be processed, and keys to be used in processing the data, must be available to the module and/or circuit performing the cryptographic operation. As noted above, cryptographic operations may require secret keys.

Regardless of how the secret keys are ultimately made available to the security module and/or device, the security module and/or device ultimately may use those secret keys to cryptographically process data received by the system and corresponding to those keys. Intruders wishing to gain unauthorized access to the data and operations being securely processed must typically first determine the keys being used to cryptographically process the data. Some methods used by intruders to determine the keys are mathematically based, and employ mathematical operations, and sometimes brute-force computation methods, to analyze the encrypted data that is available to the intruders to try to identify the keys and decrypt the data. Other more recent methods involve looking at characteristics of the signals emitted by the circuitry encrypting the data and processing the encrypted data, and statistically analyzing that data in order to attempt to determine the keys. For example, electromagnetic emissions from the circuitry, which will vary based on the processing occurring in the circuitry, may be analyzed to attempt to identify the keys. One specific method, differential power analysis (DPA) monitors the power consumption by specific areas of the circuitry during certain windows of time, and statistically analyze the consumed power to identify the keys.

In order to inhibit intruders from using methods such as DPA to determine the keys being employed in cryptographic operations, it can be helpful to randomize the keys and data being processed. One way to do this is by providing random masks (random blocks of numbers) to the circuitry performing the encryption operation, have those masks combined with the data and keys to randomize the data during processing, and to then have the masks extracted from the processed data at the end of processing, leaving only the processed data. Due to the random nature of the masks, the success rates of DPA and other similar methods can be decreased.

Generating and distributing random masks to thwart intruders involves the steps of creating the masks, and then distributing those masks to cryptographic circuitry. Typically, larger random masks provide more protection against intruders than smaller random masks. To create a random mask, a random number is first required. This random number is typically provided by a random number generator. Higher quality random numbers result in masks that are more successful in thwarting attacks. However, typically the higher the quality of the random number, the larger the random number generator circuitry required to generate the random number. Also, higher quality random numbers require more time to be generated than lower quality random numbers.

Once a random number has been generated, it may be distributed to a mask generator to generate the mask, and then the mask is distributed to cryptographic processing circuitry by the mask generator for use. As noted above, larger masks provide more protection than smaller masks. Large masks may be provided by a mask generator to cryptographic circuitry by wide busses, in order to allow a new mask to be provided frequently to the cryptographic circuitry. Also, a large mask size typically requires a correspondingly large random number to produce the mask. The large size of the busses between the mask generator and a cryptographic circuit can raise significant routing and timing and signal integrity issues. This situation is made even more problematic when multiple cryptogaphic processors share a single mask generator and random number generator, as the number of bus lines, and the lengths of those lines, can result in situations where successful routing and signal integrity for all devices is impossible. In addition, routing congestion can be a problem where the number and length of the bus lines and wires in certain areas of silicon require more routing space (metal layers) than are available, in addition, when multiple devices share a common random number generator, the placement of the random number generator may be constrained in such a way that it might not be possible to locate it close to mask generators. Although one possible solution might be to have each cryptographic processor having its own dedicated mask generator and random number generator, this solution quickly becomes a non-starter when the prohibitive cost in terms of real-estate required to place multiple random number generators is considered.

Accordingly, embodiments entail a layout-optimized random mask distribution system and method that creates large, strong masks and distributes those masks to multiple cryptographic processors (such as, for example, cryptographic accelerators) while minimizing the distance between the mask generators and cryptographic accelerators, the size and length of busses connecting the random number source, mask generators, and cryptographic accelerators, minimizing the need for buffers on the busses, meeting tight signal timing constraints, and avoiding routing congestion.

Figure 1:
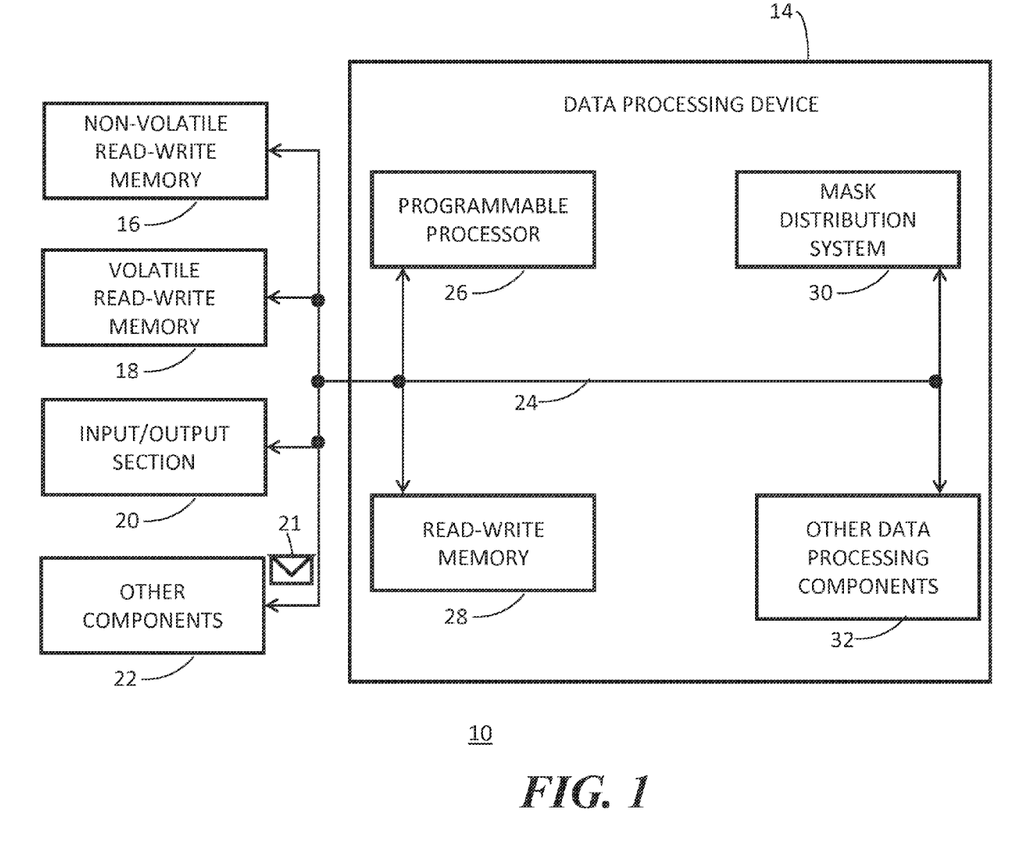
FIG. 1 shows a block diagram of a data processing system configured in accordance with the teaching of an embodiment.

FIG. 1 shows a block diagram of a data processing system 10 configured in accordance with an embodiment Data processing system 10 may be configured for any of a wide variety of different data-processing applications, including, but not limited to, a personal computer, workstation, server, laptop computer, handheld computer, music, video or other digital media player, cell phone, router, modem, industrial controller or DRM player.

Data processing system 10 comprises non-volatile read-write memory 16, volatile read-write memory 18, an input/output section 20, a data processing device 14, and other components 22 of a type and configuration understood to those skilled in the art of data processing and computerized devices. Memory 16, memory 18, section 20, and other components 22 couple together and to data processing device 14 through a bus 24 that conveys data, addresses and control signals.

Data processing device 14 comprises a programmable processor 26, read-write memory 28, a mask distribution system 30, and other data processing components 32, which couple to one another through one or more data busses 24. Programmable processor 26 may be viewed as a central processing unit (CPU), processor, controller, microcontroller, microprocessor, or the like. Programmable processor 26 may, but is not required to, be the only programmable processor for data processing device 14. In an embodiment, programmable processor 26 is a single-core processor. In an alternative embodiment, programmable processor 26 is a multi-core processor having multiple processor cores. A programmable processor 26 differs from an unprogrammable processor in that the software, programming instructions, or code it executes may be changed or augmented in some way after data processing system 10 and data processing device 14 have been manufactured. In an embodiment, read-write memory 28 may be non-volatile read-write memory, such as, for example, flash memory. In an alternate embodiment, read-write memory 28 may be volatile read-write memory, such as, for example, dynamic random access memory (DRAM).

Each of programmable processor 26, read-write memory 28, other data processing components 32, and data busses 24 may be configured and operate in a conventional manner. Thus, read-write memory 28 may include any amount of both volatile and non-volatile memory configured for read and write operations. Computer software instructions for execution by programmable processor 26 and data for processing by programmable processor 26 may be stored in read-write memory 28, or may be considered to be a part of programmable processor 26. Programmable processor 26 executes any number of different computer software programs and processes data in accordance with the dictates of the programs.

Data busses 24 are used in moving data into and out of data processing device 14. For example, input/output section 20 may provide data to/from data processing device 14. Input/output section 20 may comprise such items as a keyboard, pointing device, microphone, camera, card reader, barcode reader, printer, display, speaker, and the like. In addition, other components 22 may provide data to/from data processing device 14. Other components 22 may also or alternatively include such items as a wireless interface, a network interface, universal serial bus (USW) port, Firewire port, public switched telecommunication network (PSTN) interface, or the like. In an alternative embodiment, data processing system 10 may have a different configuration.

FIG. 1 also shows a data packet 21. Data packet 21 includes data to be processed by data processing system 10. In an embodiment, data packet 21 is a data packet received via other components 22, such as, for example, a network device. Data packet 21 is shown being provided on bus 24 to other elements of data processing system 10.

Figure 2:
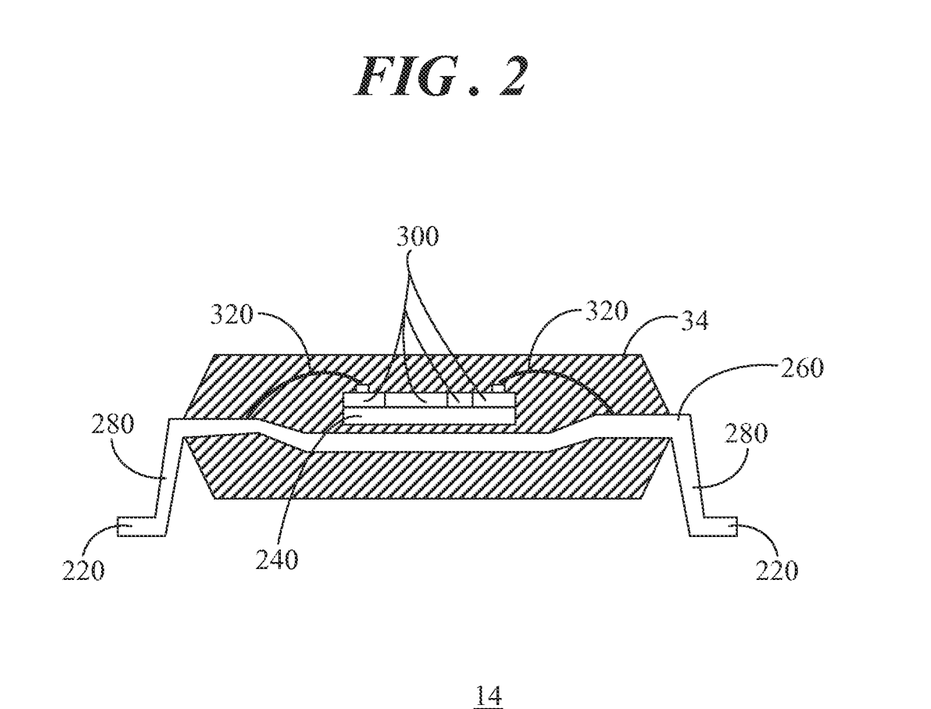
FIG. 2 shows a cross-sectional side-view representation of a data processing integrated circuit used in accordance with the teaching of an embodiment.

FIG. 2 shows a cross-sectional, side-view representation of data processing device 14 according to another embodiment. In this embodiment, data busses 24, programmable processor 26, read-write memory 28, other data processing components 32 and mask distribution system 30, collectively referred to as electronic circuits 300 in this embodiment, are all formed together on a common semiconductor substrate and are packaged together and reside within a single integrated circuit 34. Integrated circuit 34 is desirably produced in accordance with conventional, low cost integrated circuit processing techniques. Such techniques are well established and promote the low cost nature of integrated circuit 34, which likewise promotes a low cost characteristic for data processing system 10 (FIG. 1).

Integrated circuit 34 includes a substrate 240 attached to a leadframe 260. Leadframe 260 includes any number of pins 280, one or more of which serve as a data port 220 for moving data into and out from integrated circuit 34.

Substrate 240 may be provided by any type of substrate on which electronic circuits 300 are formed in accordance with semiconductor integrated circuit processing techniques known to those skilled in the art. Hence, substrate 240 is a semiconductor, integrated circuit substrate. Electronic circuits 300 need not be formed directly in contact with substrate 240 but may also be formed on or above other layers that more directly reside on substrate 240.

Some of electronic circuits 300 electrically couple to pins 280 through wire bonds 320 or using any other technique known to those skilled in the art. Substrate 240, including all electronic circuits 300 directly or indirectly formed thereon, is embedded within integrated circuit 34 in a manner known to those skilled in the art, and preferably in accordance with one of the lower cost techniques which encapsulates substrate 240 in a polymeric material, such as an epoxy or plastic. Pins 280 protrude from integrated circuit 34 and are measurable from outside integrated circuit 34 using conductive electronic probes, by coupling pins 280 to other electronic components, or in any other way known to those of skill in the art.

Those skilled in the art will appreciate that nothing requires integrated circuit 34 to be formed in the shape depicted in FIG. 2 or using the type of pin structure depicted in 2. Any of the wide variety of packages and pin structures known in the art may be adopted in manufacturing integrated circuit 34. Likewise, nothing requires substrate 240 to be formed in a single monolithic section. Rather multiple sections may be provided for substrate 240 with all such sections embedded within integrated circuit 34.

Figure 3:
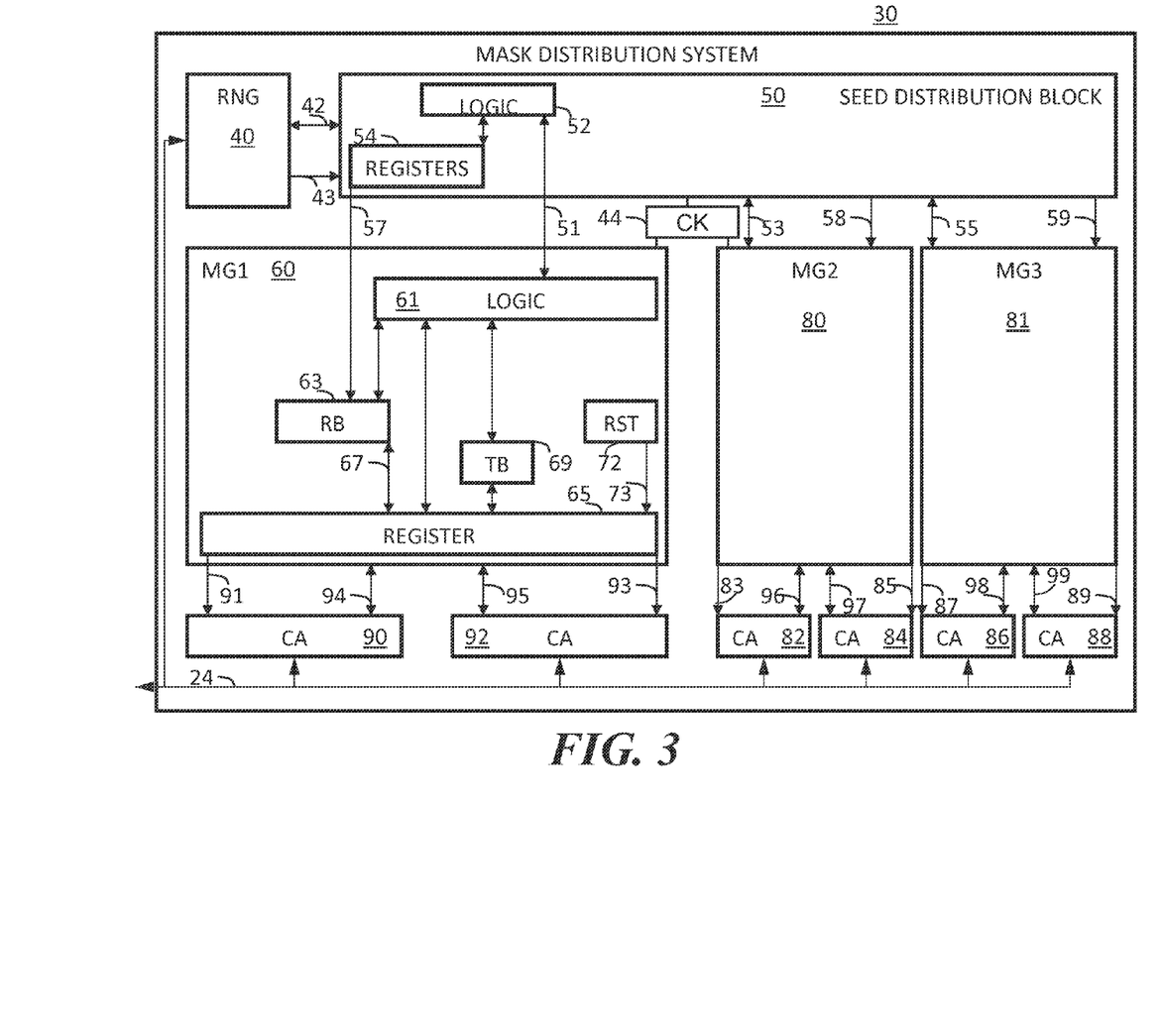
FIG. 3 shows a block diagram of a mask distribution system of the data processing system depicted in FIG. 1, according to an embodiment.

FIG. 3 shows a block diagram of a mask distribution system 30 of the data processing device 14, according to the embodiment of FIG. 1. Among other things, mask distribution system 30 is configured to generate and distribute data blocks, referred to as masks, to devices and/or circuitry performing cryptographic processing of data. In an embodiment, mask distribution system 30 comprises a random number generator 40. In one embodiment, random number generator 40 is a Federal Information Processing Standard (BPS) certified random number generator configured to provide large, high-quality random numbers to elements to which it is electronically coupled In an embodiment generally illustrated in FIG. 3, random number generator 40 is configured to generate random numbers 256 bits in length. Random numbers may also be referred to as seeds.

Random number generator 40 is electronically coupled to a seed distribution block 50 of mask distribution system 30 via control signal bus 42 and data bus 43. Bus 42 is configured to allow control and status signals to pass back and forth between random number generator 40 and seed distribution block 50. Data bus 43 is a parallel data bus configured to provide random numbers generated by random number generator 40 to seed distribution block 50. In operation, seed distribution block 50 is configured to send an electronic signal to random number generator 40 via bus 42 requesting that random number generator 40 generate a random number. Random number generator 40 is configured to generate a 256-bit random number responsive to the electronic signal received from seed distribution block 50, and provide that random number to seed distribution block 50 over data bus 43. In an embodiment, random number generator 40 provides the random number to seed distribution block 50 64-bits at a time. Random number generator 40 is shown further electronically coupled to data busses 24, such that it may communicate with, and provide random numbers to, additional devices external to mask distribution system 30 coupled to data busses 24.

In addition to being coupled to random number generator 40, seed distribution block 50 and logic block 52 of seed distribution block 50 are electronically coupled to each of mask generator 60, mask generator 80 and mask generator 81 of mask distribution system 30 via bus 51, bus 53 and bus 55, respectively. Each of bus 51, bus 53 and bus 55 is configured to allow control and status signals to pass back and forth between logic block 52 of seed distribution block 50 and mask generator 60, mask generator 80 and mask generator 81, respectively. Seed distribution block 50, and register 54 of seed distribution block 50, are electronically coupled to each of mask generator 60, mask generator 80 and mask generator 81 via data bus 57, data bus 58 and data bus 59, respectively. Each of data bus 57, data bus 58 and data bus 59 is a parallel data bus configured to provide random numbers from seed distribution block 50 to mask generator 60, mask generator 80 and mask generator 81, respectively. In an embodiment generally illustrated in FIG. 3, data bus 57, data bus 58 and data bus 59 are each 8 bits wide, such that 8 bits of data may be passed in parallel to each of mask generator 60, mask generator 80 and mask generator 81. As shown, seed distribution block 50 comprises logic block 52 coupled to register 54. In an embodiment, register 54 is a 32-byte register configured to store random numbers of various widths.

In operation, seed distribution block 50 is configured to receive electronic signals from mask generator 60, mask generator 80 and mask generator 81 via bus 51, bus 53 and bus 55, respectively. These signals indicate that mask generator 60, mask generator 80 and mask generator 81 are requesting a random number. Seed distribution block 50 is configured, responsive to signals requesting a random number, to send an electronic signal to random number generator 40 via bus 42 requesting that random number generator 40 provide a random number. When seed distribution block 50 receives random numbers from random number generator 40 responsive to its requests for random numbers, seed distribution block 50 causes the received random numbers to be stored in register 54. Seed distribution block 50 further causes the random numbers stored in register 54 to be provided to the requesting mask generator 60, mask generator 80, or mask generator 81, 8 bits at a time, via data bus 57, data bus 58 and data bus 59, respectively. The random numbers are provided 8 bits at a time, sequentially, until an entire random number has been transferred to the requesting mask generator 60, mask generator 80 or mask generator 81.

Mask distribution system 30 further comprises mask generator 60, mask generator 80 and mask generator 81, each of which is electronically coupled to seed distribution block 50 as discussed above. Each of a mask generator 60, mask generator 80 and mask generator 81 is further electronically coupled to two cryptographic accelerators. The cryptographic accelerators each implement encryption and decryption algorithms. Mask generator 60 is electronically coupled to cryptographic accelerator 90 via data bus 91, and to cryptographic accelerator 92 via data bus 93. Mask generator 80 is electronically coupled to cryptographic accelerator 82 via data bus 83, and to cryptographic accelerator 84 via data bus 85. Mask generator 81 is electronically coupled to cryptographic accelerator 86 via data bus 87, and to cryptographic accelerator 88 via data bus 89. In an alternative embodiment, mask distribution system 30 may include more or fewer than three mask generators, each of which may be coupled to more or fewer than two cryptographic accelerators.

Cryptographic accelerator 90, cryptographic accelerator 92, cryptographic accelerator 82, cryptographic accelerator 84, cryptographic accelerator 86 and cryptographic accelerator 88 are hardware blocks that each implement cryptographic algorithms. Each cryptographic accelerator may implement the same cryptographic algorithms, or they may implement different cryptographic algorithms. In an embodiment, cryptographic accelerator 90, cryptographic accelerator 92, cryptographic accelerator 82, cryptographic accelerator 84, cryptographic accelerator 86 and cryptographic accelerator 88 are configured to implement the Advanced Encryption Standard (AES). Each of data bus 91, data bus 93, data bus 83, data bus 85, data bus 87 and data bus 89 is a parallel data bus configured to provide masks from mask generator 60, mask generator 80 and mask generator 81 to the cryptographic accelerators electronically coupled to each of the parallel data busses.

In an embodiment generally illustrated in FIG. 3, data bus 91, data bus 93, data bus 83, data bus 85, data bus 87 and data bus 89 are each 256 bits wide, such that masks comprising 256 bits of data may be passed in parallel to each of the cryptographic accelerators. Furthermore, mask generator 60 is electronically coupled to cryptographic accelerator 90 via bus 94, and to cryptographic accelerator 92 via bus 95. Mask generator 80 is electronically coupled to cryptographic accelerator 82 via bus 96, and to cryptographic accelerator 84 via bus 97. Mask generator 81 is electronically coupled to cryptographic accelerator 86 via bus 98, and to cryptographic accelerator 88 via bus 99. Each of bus 94, bus 95, bus 96, bus 97, bus 98 and bus 99 is configured to allow control and status signals to pass back and forth between each mask generator mask generator 60, mask generator 80 and mask generator 81) and their respective cryptographic accelerators. In an embodiment generally illustrated in FIG. 3, the components and operation of mask generator 60 in conjunction with cryptographic accelerator 90, cryptographic accelerator 92 and seed distribution block 50 are the same as the components and operation of each of mask generator 80 and mask generator 81 with respect to seed distribution block 50 and the cryptographic accelerators to which they are electronically coupled. For that reason, only the components and operation of mask generator 60 will be shown and described in detail herein.

Mask generator 60 is shown comprising a logic block 61 electronically coupled to a register 65 such that logic block 61 may communicate data, such as, for example, commands and status information, to register 65, and vice-versa. Logic block 61 is further electronically coupled to a re-seeding block, re-seeding block 63, of mask generator 60, such that re-seeding block 63 may communicate data, such as, for example, commands and status information, to logic block 61, and vice-versa. Logic block 61 is also electronically coupled to a transformation block 69, and configured to read information from, and write information to, transformation block 69. Finally, logic block 61 is coupled to logic block 52 of seed distribution block 50 via bus 51, such that data, including commands and control signals, may be communicated between logic block 61 and logic block 52.

Mask generator 60 also comprises a reset seed 72 electronically coupled to register 65. In an embodiment generally illustrated in FIG. 3, reset seed 72 is a 256-bit random number or seed that is created either when the mask distribution system 30 is manufactured, or is created immediately upon power up of mask distribution system 30 and provided on power up of mask distribution system 30 to register 65.

Register 65 is electronically coupled to a re-seeding block 63. Re-seeding block 63 is configured to re-seed register 65 with random number information obtained from seed distribution block 50. Register 65 is configured to provide an updated 256-bit mask on each clock cycle of mask distribution system 30 to cryptographic accelerators to which it is electronically coupled by a 256-bit data bus, if a cryptographic accelerator has requested a new mask for that clock cycle. Cryptographic accelerators 90 and 92 provide requests for updated masks to register 65 via busses 94 and 95, respectively. The creation of updated masks will be discussed in great detail, infra. Each cryptographic accelerator then uses the updated masks (if updated masks were requested) as it processes an encryption algorithm, to randomize the keys and data being processed, such that intruders are inhibited from obtaining the keys. Mask distribution system 30 further comprises clock generating circuitry 44 electronically coupled to seed distribution block 50 and mask generators 60, 80 and 81, and is configured to provide a clock signal to seed distribution block 50, mask generators 60, 80 and 81, and to other components of mask distribution system 30.

Continuing to refer to FIG. 3, the operation of mask distribution system 30 is described, according to an embodiment. When power is applied to mask distribution system 30 such that mask distribution system 30 is reset, initial random numbers (seeds) in mask generator 60 are provided to register 65 so that masks can almost immediately be available to cryptographic accelerator 90 and cryptographic accelerator 92. More specifically, reset seed 72, a 256-bit seed, is loaded into register 65, making a random mask available to cryptographic accelerator 92 via data bus 93, and cryptographic accelerator 90 via data bus 91. In addition, mask generator 60 communicates a request to seed distribution block 50 via bus 51 for a new seed for register 65.

Responsive to a request from mask generator 60 for a new seed, seed distribution block 50 communicates a request for a new random number to random number generator 40 via bus 42. Responsive to the request for a new random number, random number generator 40 provides a random number to seed distribution block 50 via data bus 43. Seed distribution block 50 stores the random number in register 54, and transmits it to mask generator 60 via data bus 57 in sequential 8-bit blocks. Seed distribution block 50 continues to transfer successive 8-bit blocks of the random number to mask generator 60 until the entire random number has been transmitted.

Turning to mask generator 60, mask generator 60 sequentially receives the 8-bit blocks of the random number via data bus 57, processes them in re-seeding block 63, and provides them to register 65. More specifically, when mask generator 60 receives an 8-bit block of a random number from seed distribution block 50 in response to mask generator 60's request for a new seed from seed distribution block 50, re-seeding block 63 uses the 8-bit block to update the contents of register 65 to include the 8-bit block. In an embodiment, re-seeding block 63 may use and exclusive or (XOR) or other function to alter the contents of register 65 using the 8-bit block. When mask generator 60 receives the next 8-bit block of a random number from seed distribution block 50, re-seeding block 63 performs the same function as was performed on the first 8-bit block. Mask generator 60 and re-seeding block 63 continue processing received data blocks in this manner until the entire 256 bits of the random number have been used to place transformed sections into register 65. Once mask generator 60 has completed receiving the random number, the re-seeding process has completed for mask generator 60.

One register 65 has been re-seeded after reset as described above, register 65 will not request an additional new seed until a pre-determined number of random masks have been generated by mask generator 60 using the existing seed. When a new seed is needed, the new seed will be obtained in the same manner as discussed above. More specifically, mask generator 60 will request a new seed (new random number) from seed distribution block 50 for register 65, seed distribution block 50 will request a new random number from random number generator 40, and the new seed will be provided to register 65 of mask generator 60. Masks continue to be provided by mask generator 60 to cryptographic accelerators 90 and 92 (if one or both of the cryptographic accelerators requests a mask) during re-seeding, such that no cryptographic accelerator lacks a requested mask during re-seeding.

Continuing to refer to FIG. 3, mask generator 60 uses a transformation block 69, in conjunction with register 65, to generate new random masks. On every clock cycle in which an updated mask has been requested by a cryptographic accelerator, a new 256-bit random number is created by means of a function performed by transformation block 69. In the function performed by transformation block 69, bits of the random number located in register 65 (the contents of register 65) are altered by transformation block 69, and the altered bits are placed back into register 65. The resulting new 256-bit number is a new mask that is provided to cryptographic accelerator 90 via data bus 91 or cryptographic accelerator 92 via data bus 93. Each time that a new mask is provided in this manner, a counter in transformation block 69 is incremented. Once the counter has reached a pre-determined number, mask generator 60 requests a new seed for register 65. Once a new seed has been provided to register 65 as outlined above, the counter is reset to zero. In an alternate embodiment, register 65 is a linear feedback shift register (LFSR) in which transformation block 69 is part of register 65. In this alternate embodiment, register 65 performs a function to alter the contents of register 65, including shifting data into and out of register 65.

It should be appreciated that although only the operation of mask generator 60 has been described in detail, the components and operation of mask generator 80 and mask generator 81 are the same as for mask generator 60. Seed distribution block 50 acts to provide new seeds to each of mask generator 60, mask generator 80 and mask generator 81 upon request, and when multiple requests are received, is configured to prioritize those requests and provide the requested random numbers to each of mask generator 60, mask generator 80 and mask generator 81 such that each mask generator receives its requested seed when required. In an embodiment, each of mask generators 60, 80 and 81 is configured to generate a random mask on each cycle of a clock signal generated by clock generating circuitry 44 in which a mask has been requested by a cryptographic accelerator.

Figure 4:
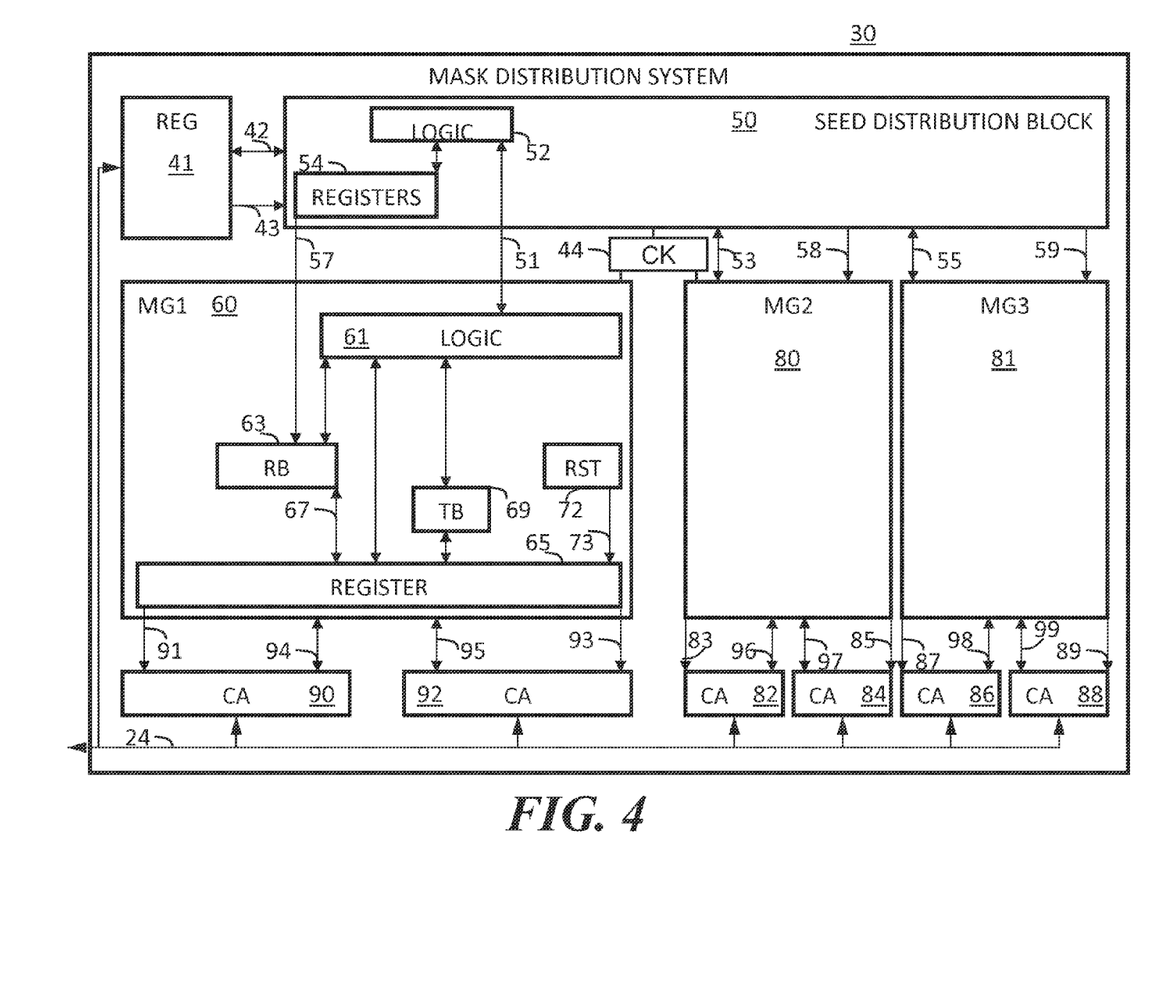
FIG. 4 shows a block diagram of a mask distribution system of the data processing system depicted in FIG. 1, according to an alternate embodiment.

FIG. 4 shows a block diagram of a mask distribution module of the data processing system depicted in FIG. 1, according to an alternate embodiment. In this embodiment, mask distribution system 30 comprises register 41 rather than a random number generator 40. Register 41 is coupled to seed distribution block 50 via control signal bus 42 and data bus 43. Bus 42 is configured to allow control and status signals to pass back and forth between register 41 and seed distribution block 50. Data bus 43 is a parallel data bus configured to provide data present in register 41 to seed distribution block 50. Register 41 is shown further electronically coupled to data busses 24, such that it may communicate with, and provide random numbers to, additional devices external to mask distribution system 30 coupled to data busses 24. Register 41 contains data, such as random numbers, stored into it by devices external to seed distribution block 50. This embodiment operates identically in all respects to the embodiment in FIG. 3, with the exception that rather than issuing a request for a new random number to a random number generator via bus 42, seed distribution block 50 issues a request to load a random number from register 41.

Figure 5:
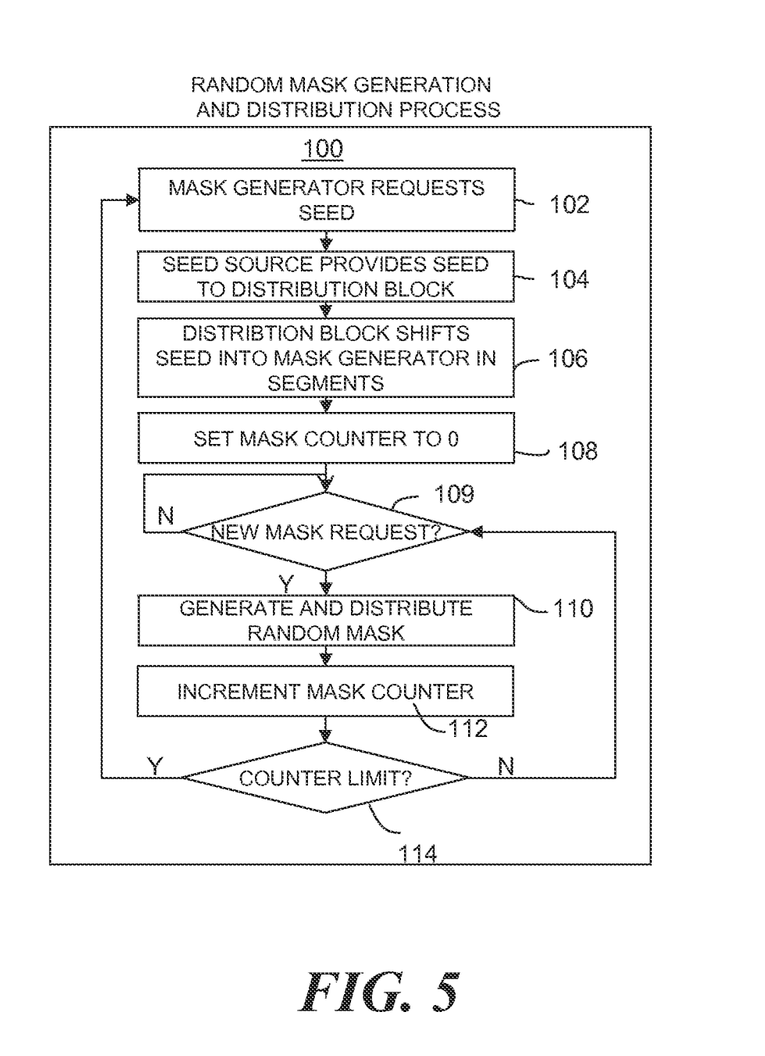
FIG. 5 shows a flow chart of a mask distribution method, according to an embodiment.

FIG. 5 shows a flowchart of a random mask generation and distribution process 100 according to an embodiment. In a first step 102 of random mask generation and distribution process 100, a mask generator requests a new seed. In an embodiment, the seed is a random number. In a second step 104, a new seed is provided from the seed source to a seed distribution block, in a third step 106, the seed distribution block shifts the new seed in segments into the mask generator that requested the seed. In a fourth step 108, a mask counter in the mask generator is set to a value of O. Fifth step 109 is a decision step in which a determination is made as to whether or not a new mask has been requested by a cryptographic accelerator. If a new mask has not been requested, processing remains at step 109. If a new mask has been requested, processing continues with step 110. In a sixth step 110, a random mask is generated by the mask generator using the new seed and distributed to a cryptographic accelerator. In a sixth step 112, the mask counter is incremented by one count. In a seventh step 114, a determination is made as to whether or not the counter in the mask generator has reached a pre-set value. If the counter has not reached the pre-set value, processing returns to step 109 to determine if a new mask has been requested by a cryptographic accelerator, if the counter has reached the pre-set value, processing returns to step 102 in which the mask generator requests a new seed.

In summary, in an embodiment, a data processing system comprises a random number source, a random number distribution circuit configured to distribute random numbers to a mask generating circuit, a mask generating circuit configured to create random masks from the random numbers, and cryptographic accelerator circuitry configured to receive random masks from the mask generating circuit and use the random masks to perform a cryptographic algorithm. In an alternative embodiment, a random mask distribution system comprises a random number source, a random number distribution circuit, a mask generating circuit configured to request random numbers from the random number distribution circuit, receive requested random numbers from the random number distribution circuit, create random masks from the random numbers, and provide the random masks external to the mask generating circuit, and first and second cryptographic accelerator circuits, each configured to receive random masks from the mask generating circuit and use the masks to perform cryptographic algorithms. A method of distributing random masks in a cryptographic system is also provided, comprising the operations of providing a new random number to a random number distribution circuit, transmitting the random number in segments to a mask generating circuit, generating random masks in the mask generating circuit using the random number segments, and distributing the random masks from the mask generating circuit to a cryptographic accelerator.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A data processing system comprising:
a random number source configured to provide random numbers;
a random number distribution circuit electronically coupled to said random number source via a first bus, wherein said random number distribution circuit is configured to receive random numbers from said random number source via said first bus and provide the random numbers external to said random number distribution circuit;
a first mask generating circuit electronically coupled to said random number distribution circuit via a second bus, wherein said first mask generating circuit is configured to receive random numbers via said second bus from said random number distribution circuit, create random masks from the random numbers, and provide random masks external to said mask generating circuit; and
first cryptographic accelerator circuitry electronically coupled to said first mask generating circuit via a third bus, wherein said first cryptographic accelerator circuitry is configured to receive random masks from said mask generating circuit via said third bus, and use the random masks to perform a cryptographic algorithm.

2. A data processing system as claimed in claim 1 additionally comprising second cryptographic accelerator circuitry electronically coupled to said first mask generating circuit via a fourth bus, wherein said second cryptographic accelerator circuitry is configured to receive random masks from said mask generating circuit via said fourth bus, and use the random masks to perform a cryptographic algorithm.

3. A data processing system as claimed in claim 1 additionally comprising a second mask generating circuit electronically coupled to said random number distribution circuit via a fifth bus, wherein said second mask generating circuit is configured to receive random numbers via said fifth bus from said random number distribution circuit, create random masks from the random numbers, and provide the random numbers external to said mask generating circuit, said data processing system still further comprising a third cryptographic accelerator electronically coupled to said second mask generating circuit via a sixth bus, and a fourth cryptographic accelerator electronically coupled to said second mask generating circuit via a seventh bus, wherein said third and fourth cryptographic accelerators are configured to receive random masks from said mask generating circuit via said sixth and seventh busses, and use the masks to perform a cryptographic algorithm.

4. A data processing system as claimed in claim 1, wherein said random number source is a random number generator.

5. A data processing system as claimed in claim 1, wherein said first mask generating circuit is further configured to monitor the number of random masks created by said first mask generating circuit from a given random number, and when a pre-determined number of random masks have been created, request a new random number from said random number distribution circuit, receive a new random number from said random number distribution circuit, and use the new random number to generate random masks.

6. A data processing system as claimed in claim 1, wherein said random number distribution circuit further comprises a register configured to store random numbers received from said random number source, and wherein said random number distribution circuit is further configured to provide a random number stored in said register, in segments having a size less than the size of the random number, in a sequential fashion, external to said random number distribution circuit via said second bus.

7. A data processing system as claimed in claim 1, further comprising clock circuitry providing a clock signal having clock cycles to said mask generating circuit, wherein said mask generating circuit is further configured to be capable of providing a random mask to said cryptographic accelerator on each clock cycle.

8. A random mask distribution system comprising:
a random number source;
a random number distribution circuit electronically coupled to said random number source via a first bus, wherein said random number distribution circuit is configured to receive random numbers from said random number source via said first bus and provide the random numbers external to said random number distribution circuit;
a first mask generating circuit electronically coupled to said random number distribution circuit via a second bus, wherein said first mask generating circuit is configured to request random numbers from said random number distribution circuit, receive requested random numbers via said second bus from said random number distribution circuit, create random masks from the random numbers, and provide the random masks external to said mask generating circuit; and
first and second cryptographic accelerator circuits electronically coupled to said first mask generating circuit via third and fourth busses, respectively, wherein said first and second cryptographic accelerator circuits are each configured to receive random masks from said mask generating circuit via said third and fourth busses, and use the masks to perform cryptographic algorithms.

9. The random mask distribution system as claimed in claim 8, further comprising
a second mask generating circuit electronically coupled to said random number distribution circuit via a fifth bus, wherein said second mask generating circuit is configured to request random numbers from said random number distribution circuit, receive requested random numbers via said fifth bus from said random number distribution circuit, create random masks from the random numbers, and provide the random masks external to said mask generating circuit; and
third and fourth cryptographic accelerator circuits electronically coupled to said second mask generating circuit via sixth and seventh busses, respectively, wherein said third and fourth cryptographic accelerator circuits are each configured to receive random masks from said mask generating circuit via said sixth and seventh busses, and use the masks to perform cryptographic algorithms.

10. The random mask distribution system as claimed in claim 8, wherein said first, second and third busses are parallel busses having a width in bits, and wherein said first and third busses have a width in bits that is at least twice the width of said second bus.

11. The random mask distribution system as claimed in claim 8, wherein said third bus has a width that is at least twice the width of said first bus.

12. The random mask distribution system as claimed in claim 8, wherein said random number distribution circuit further comprises a register configured to store random numbers received from said random number source, and wherein said random number distribution circuit is further configured to provide a random number stored in said register, in segments having a size less than the size of the random number, in a sequential fashion, to said first mask generating circuit via said second bus.

13. The random mask distribution system as claimed in claim 8, further comprising clock circuitry providing a clock signal having clock cycles to said random number distribution circuit and said first mask generating circuit, wherein said mask generating circuit is further configured, responsive to a request from a cryptographic accelerator, to create a random mask on each clock cycle, and provide the random mask to a cryptographic accelerator on each clock cycle.

14. The random mask distribution system as claimed in claim 8, wherein said first mask generating circuit is further configured to monitor the number of random masks created by said first mask generating circuit from a given random number, and when a pre-determined number of random masks have been created, request a new random number from said random number distribution circuit, receive a new random number from said random number distribution circuit, and use the new random number to generate random masks.

15. The random mask distribution system as claimed in claim 8, wherein said random number source is a random number generator.

16. The random mask distribution system as claimed in claim 8, wherein said first mask generating circuit further comprises a register electronically coupled to said first and second cryptographic accelerators, wherein said registers is configured to use a random number provided by said mask distribution system to generate random masks and distribute them to said first and second cryptographic accelerators.

* * * * *